US008868995B2

(12) United States Patent
Bennett

(10) Patent No.: US 8,868,995 B2
(45) Date of Patent: *Oct. 21, 2014

(54) MULTICAST DIGITAL VIDEO LOST PACKET RECOVERY

(75) Inventor: James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 355 days.

This patent is subject to a terminal disclaimer.

(21) Appl. No.: 13/366,493

(22) Filed: Feb. 6, 2012

(65) Prior Publication Data

US 2012/0166895 A1 Jun. 28, 2012

Related U.S. Application Data

(63) Continuation of application No. 12/327,041, filed on Dec. 3, 2008, now Pat. No. 8,112,542.

(60) Provisional application No. 61/086,877, filed on Aug. 7, 2008.

(51) Int. Cl.
 H04L 1/18 (2006.01)
 G06F 11/00 (2006.01)
 H04N 21/4363 (2011.01)
 (Continued)

(52) U.S. Cl.
 CPC ..... H04N 7/17318 (2013.01); H04N 21/43637 (2013.01); H04N 21/6375 (2013.01); H04N 21/6125 (2013.01); H04L 1/1607 (2013.01); H04N 21/47202 (2013.01); H04L 65/80 (2013.01); H04L 2001/0093 (2013.01)
 USPC ............................ 714/748; 714/704; 714/749

(58) Field of Classification Search
 CPC ... H04L 1/1809; H04L 1/1812; H04L 1/1887; H04L 1/1819; H04L 2001/0093; H04L 1/1671; H04L 1/188; H04L 12/1868; H04L 12/189; H04L 12/1863; H04L 1/16071; H04W 28/04; H04W 84/20; G06F 11/1443; H04N 7/17318
 USPC ........................... 714/704, 748, 749; 370/312
 See application file for complete search history.

(56) References Cited

U.S. PATENT DOCUMENTS 6,856,810 B2 * 2/2005 Davies .......................... 455/507
7,688,755 B2 * 3/2010 Xiao et al. .................... 370/254

(Continued)

OTHER PUBLICATIONS

Hairuo Ma; El Zarki, M., "Transmission of MPEG-2 encoded VoD services over wireless access networks using type-II hybrid ARQ schemes with RCPC codes," System Sciences, 2000. Proceedings of the 33rd Annual Hawaii International Conference on , vol., No., pp. 10 pp.,, Jan. 4-7, 2000.*

(Continued)

*Primary Examiner* — Cynthia Britt
(74) *Attorney, Agent, or Firm* — Garlick & Markison; Bruce E. Garlick

(57) ABSTRACT

An electronic communication network supports delivery of video program Internet protocol packets. A source device transmits both first and second video program Internet protocol packets. A first recipient device is assigned as positive acknowledgment leader by the source device and a second recipient device is assigned as negative acknowledgement leader by the source device. The first recipient device is operable to transmit to the source device a positive acknowledgment of receipt of the first video program Internet protocol packet. The second recipient device is operable to transmit to the source device a negative acknowledgment of non-receipt upon not receiving the first video program Internet protocol packet. The source device responds to the negative acknowledgement of non-receipt by the second recipient device by multicast resending the second video program Internet protocol packet to both the first and second recipient devices.

20 Claims, 12 Drawing Sheets

(51) Int. Cl.
*H04N 21/6375* (2011.01)
*H04N 7/173* (2011.01)
*H04N 21/61* (2011.01)
*H04L 1/16* (2006.01)
*H04N 21/472* (2011.01)
*H04L 29/06* (2006.01)
*H04L 1/00* (2006.01)

(56) References Cited

U.S. PATENT DOCUMENTS 7,920,497 B2 * 4/2011 Gaur .................... 370/310.2
8,112,542 B2 * 2/2012 Bennett ................... 709/231

OTHER PUBLICATIONS

Cameron, F.; Zukerman, M.; Gitlits, M., "Adaptive transmission parameters optimisation in wireless multi-access communication," Networks, 1999. (ICON '99) Proceedings. IEEE International Conference on , vol., No., pp. 91,95, Sep. 28-Oct. 1, 1999.*

Ya-Qin Zhang, "Media streaming over mobile networks," Signal Processing Proceedings, 2000. WCCC-ICSP 2000. 5th International Conference on , vol. 1, No., pp. 25 vol. 1 ,, 2000.*

Xing Zheng; Chan, S.-H.G.; Qian Zhang; Wen-Wu Zhu; Ya-Qin Zhang, "Feedback-free packet loss recovery for video multicast," Communications, 2003. ICC '03. IEEE International Conference on , vol. 2, No., pp. 870,874 vol. 2, May 11-15, 2003.*

\* cited by examiner

MULTICAST DIGITAL VIDEO LOST PACKET RECOVERY

CROSS REFERENCES TO RELATED APPLICATIONS

The present U.S. Utility Patent Application claims priority under 35 U.S.C. §120, as a continuation of U.S. Utility patent application Ser. No. 12/327,041, filed Dec. 3, 2008, which is incorporated herein by reference in its entirety for all purposes.

The application Ser. No. 12/327,041 claims priority under 35 U.S.C. §119(e) to U.S. Provisional Application No. 61/086,877, filed Aug. 7, 2008, which is also incorporated herein by reference in its entirety for all purposes.

BACKGROUND

1. Technical Field

The present invention relates generally to multimedia content; and, more particularly, to packetized delivery of digital video.

2. Related Art

The horizon of television and video program consumption today is reshaped by the presence of the vast and highly developed Internet backbone, with high bit transmission rates and low transmission error rates. Hence, most consumers of television and video programs today opt for delivery of television programs, live or on demand video programs via the Internet. This is cost effective and reaches most remote regions of the world. In addition, consumers may access television programs and video programs produced and broadcast anywhere around the world. Much of this video content is deliberately produced for consumers who use Internet as the medium for access of the video content with much of the video content produced by the consumers themselves in and around their homes.

Considering these changes many Internet service providers and other Internet based service providers today deliver video content ranging from live television broadcasts to video content on demand from around the world on a monthly rental or pay per view basis. This video content may include movies, music programs as well as other entertainment related video programs. Many of the "content providers" incorporate data rights management to limit the use of the video content by the consumers.

The consumers may receive the content at home in multiple localities such as living room, kitchen, bedrooms and children's rooms as well as in small commercial locations such as restaurants or cafes. In these areas where video content is delivered to multiple recipients, a source device, such as an access point, delivers the video content to the plurality of recipient devices either wirelessly or via wires. The recipient devices may receive either video program Internet protocol packets from the access points or de-packetized video program Internet protocol packet contents. This "video stream" may include encoded video frames, e.g., MPEG video frames that include independent and predictive video frames, e.g., backward predictive and/or forward predictive video frames.

Upon receiving these video program Internet protocol packets or independent, reference video frames, the recipient devices respond either by acknowledgement of receipt or negative acknowledgment of non-receipt. In case of negative acknowledgment of non-receipt, the access point resends the video program Internet protocol packets or independent, reference video frames. Each of the recipient devices independently responds by acknowledgement of receipt or negative acknowledgment of non-receipt and the access point responds in turn by resending video program Internet protocol packets or independent, reference video frames upon negative acknowledgment of non-receipt. Such operations may cause unacceptable network congestions. These and other limitations and deficiencies associated with the related art may be more fully appreciated by those skilled in the art after comparing such related art with various aspects of the present invention as set forth herein with reference to the figures.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
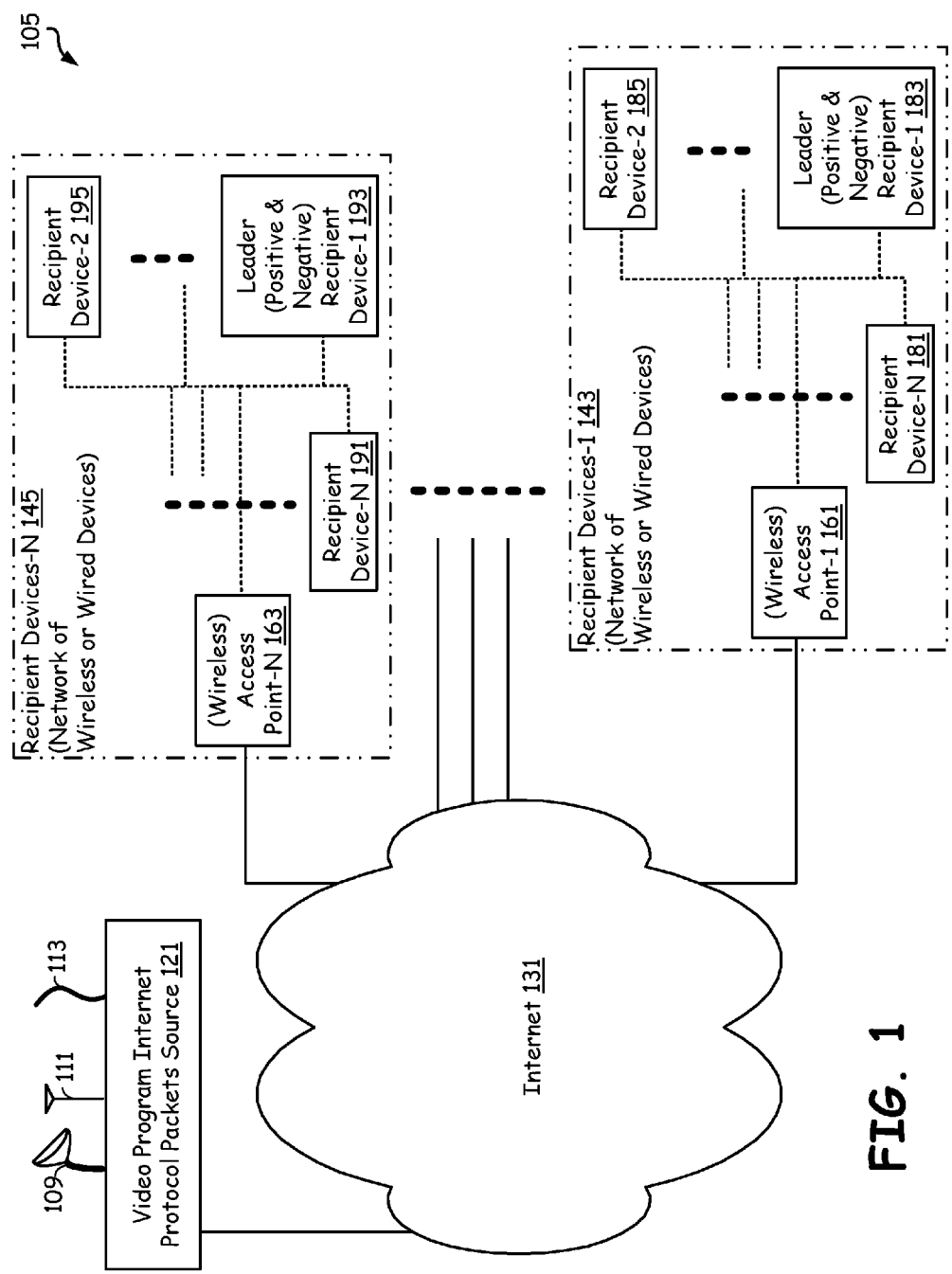
FIG. 1 is a schematic block diagram illustrating a system of wired or wireless electronic networks, each containing an access point that receives video program IP packets from a video program IP packet source via the Internet and a plurality of communicatively coupled recipient devices, one of which in each network being assigned as a leader for acknowledgment of receipt or negative acknowledgment of non-receipt of IP packets or video frames, allowing multicast resending of the IP packets or video frames to all of the recipient devices upon negative acknowledgement according to one or more embodiments of the present invention.

FIG. 1 is a schematic block diagram illustrating a system 105 of wired or wireless electronic networks 143, 145, each containing an access point 161 or 163 that receives video program IP packets from a video program IP packet source 121 via the Internet 131, and a plurality of communicatively coupled recipient devices 181, 183 and 185 or 191, 193 or 195, one of which in each network 143 and 145 being assigned as a leader for acknowledgment of receipt or negative acknowledgment of non-receipt of IP packets (183 or 193 in the illustration) or video frames, allowing multicast resending of the IP packets or video frames to all of the recipient devices 181, 183 and 185 or 191, 193 or 195 upon negative acknowledgement according to one or more embodiments of the present invention. In specific, the current illustration shows wired or wireless local area networks 143 and 145, e.g., Ethernets, IEEE 802.11x networks, etc., such as ones that exist at homes or restaurants where many a user accesses video programs sourced by the video program Internet protocol packets source 121.

The access point 161, for example, assigns one of the communicatively coupled recipient devices 181, 183 or 185 as leader 183 for acknowledgment of receipt or negative acknowledgment of non-receipt of IP packets or video frames, the leader having a communication path to the access point 161 that has highest transmission error rate. The leader 183 alone responds by either acknowledgment of receipt or negative acknowledgment of non-receipt of IP packets or video frames, and the access point 161 responds by multicast resending of either IP packets or video frames to all of the recipient devices 181, 183, and 185. The access point 161 presumes that the noise in the communication path faced by the leader 183 applies equally to all of the recipient devices 181, 183 or 185 in the network 143 and if the leader 183 did not get an IP packet or video frame (error free or at all), it is likely that all of the recipient devices 181, 183 and 185 have not received the IP packet or video frame.

When any of the recipient devices 181 or 185, other than the leader 183, did not get an IP packet or video frame and only the leader gets the corresponding IP packet or video frame, they do not respond at all (for example, by negative acknowledgment of non-receipt). Similarly, the recipient devices 181 or 185, other than the leader 183, do not respond by acknowledgment of receipt, when they get the IP packet or video frame either. Thus, only the leader 183, having highest transmission error rate, responds by acknowledgment of receipt or negative acknowledgment of non-receipt of IP packets or video frames and rest of the recipient devices 181 or 185 do not respond regardless of whether they receive IP packets or video frames. The access point 161 always responds to a negative acknowledgment of non-receipt of IP packets or video frames by multicast resending the corresponding IP packet or video frame to all of the recipient devices 181, 183, and 185, thus minimizing bandwidth requirements of the local area network 143 as well as that of Internet 131.

Similar considerations apply for the local area wired or wireless network 145. In summary, the access points 161 or 163 receive acknowledgment of receipt or negative acknowledgment of non-receipt of IP packets or video frames in their corresponding networks only by a leader recipient device 183 or 193, and not from any other constituent recipient devices 181, 185 or 191, 195. The multicast resending by the access points 161 or 163, upon negative acknowledgment of non-receipt of IP packets or video frames, involve sending either the IP packet or video frame to all of the recipient devices simultaneously. The recipient devices 181, 185 or 191, 195 listen to the negative acknowledgment of non-receipt by the leader 183 or 193 and automatically prepare to receive the corresponding IP packet or video frame, if they didn't receive them properly already, and present them to the users. Both of the networks 143 and 145 incorporate DRM (Digital Rights Management) overlaying the communication, such that the recipient devices 181, 183, 185 or 191, 193, 195 do not allow users to violate rights of the owners of the video content.

The networks 143 and 145 may be wired or wireless networks, may be local area networks of small size containing less than ten recipient devices or slightly larger in size and may work at the levels of Internet protocol packets or independent, reference and re-referencing frames (that is, transmitting temporally and spatially compressed video frames). In case of video frames being transmitted, it is critical that all recipient devices receive independent and referencing frames.

The illustration shows additional components or equipment associated with the video program Internet protocol packets source 121, such as dish antenna 109, any other kind of antenna 111 or fiber optic cable connections 113. Thus, the video program Internet protocol packets source 121 may source a live television programs or video programs stored in its server including movies and music videos.

Figure 2:
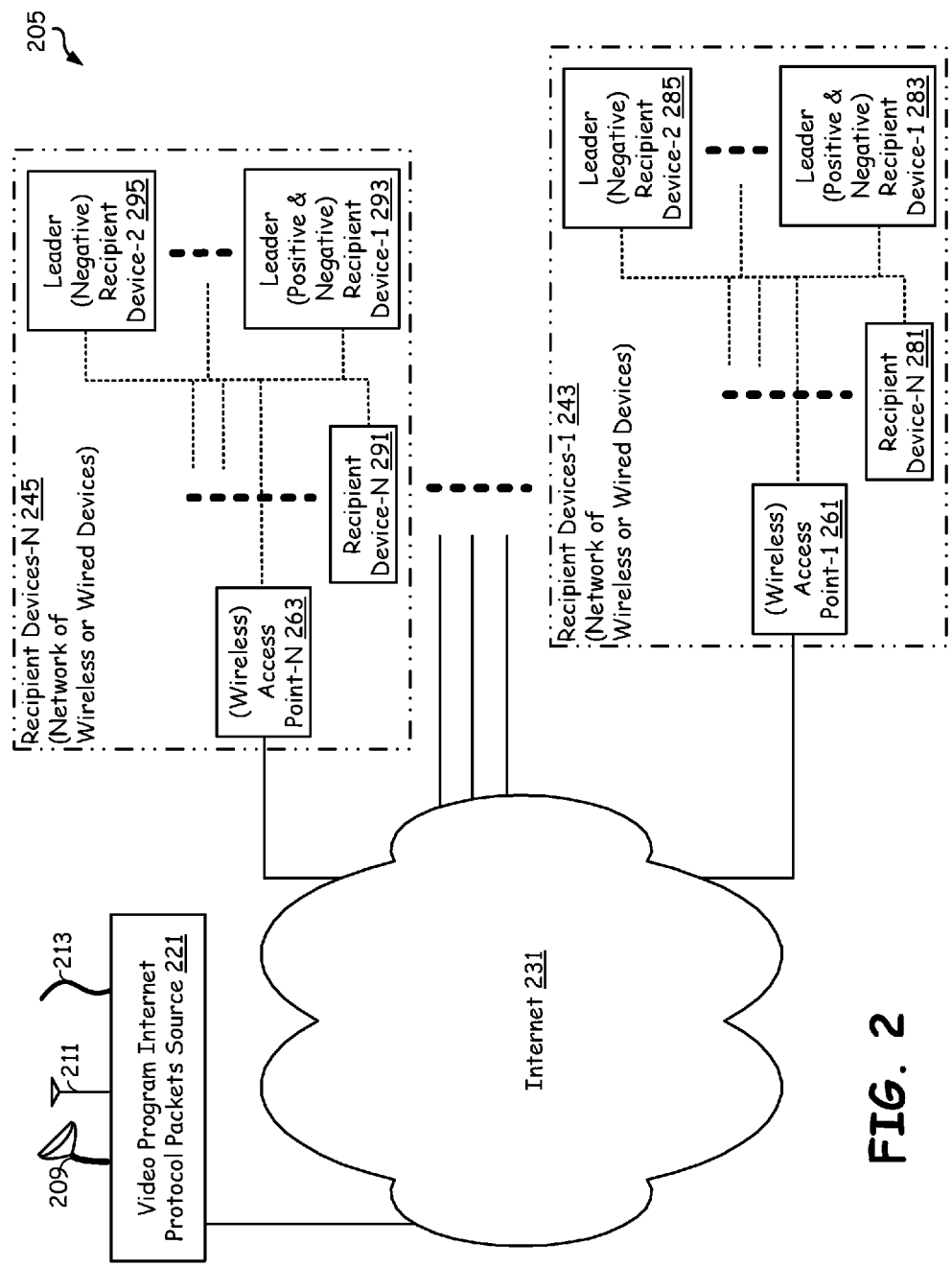
FIG. 2 is a schematic block diagram illustrating a system of wired or wireless electronic networks, each containing an access point that receives video program IP packets from a video program IP packet source via the Internet and a plurality of communicatively coupled recipient devices, one of which in each network being assigned as a primary leader for acknowledgment of receipt or negative acknowledgment of non-receipt and a second recipient device as a secondary leader for negative acknowledgment of non-receipt alone of IP packets or video frames, allowing multicast resending of the IP packets or video frames to all of the recipient devices upon negative acknowledgement from either of the leaders according to one or more embodiments of the present invention.

FIG. 2 is a schematic block diagram illustrating a system 205 of wired or wireless electronic networks 243 or 345, each containing an access point 261 or 263 that receives video program IP packets from a video program IP packet source 221 via the Internet 231, and a plurality of communicatively coupled recipient devices 281, 283, 285 or 291, 293 or 295, one of which in each network 243 and 245 being assigned as a primary leader 283 or 293 for acknowledgment of receipt or negative acknowledgment of non-receipt and a second recipient device as a secondary leader 285 or 295 for negative acknowledgment of non-receipt alone of IP packets or video frames, allowing multicast resending of the IP packets or video frames to all of the recipient devices upon negative acknowledgement from either of the leaders 283, 285 or 293, 295 according to one or more embodiments of the present invention.

The access point 261, for example, assigns a primary leader 283 for acknowledgment of receipt or negative acknowledgment of non-receipt and a second recipient device as a secondary leader 285 for negative acknowledgment of non-receipt alone of IP packets or video frames. That is, in this embodiment, the access point 261 assigns two leaders 283 and 285, both having highest transmission error rates compared to other recipient devices. When the access point 261 transmits an IP packet or a video frame the primary leader 283 may respond by negative acknowledgment of non-receipt, upon not receiving an IP packet or video frame. The access point 261 in turn responds by multicast resending the IP packet or video frame, similar to the embodiment described in reference to the FIG. 1.

On the contrary, when the access point 261 transmits an IP packet or a video frame the primary leader 283 may respond by acknowledgment of receipt upon receiving the IP packet and video frame. If, then the secondary leader 285, possibly located in a different region of the network 243 where communication path noise considerations are different, responds by negative acknowledgment of non-receipt of the IP packet or video frame upon not receiving the IP packet or video frame, the access point 261 responds by multicast resending the IP packet or video frame to all of the recipient devices 281, 283 or 285. Both of the networks 243 and 245 incorporate DRM (Digital Rights Management) overlaying the communication, such that the recipient devices 281, 283, 285 or 291, 293, 295 do not allow users to violate rights of the owners of the video content.

In both of the above mentioned scenarios, the rest of the recipient devices (such as device 281) do not respond either with acknowledgment of receipt or negative acknowledgment of non-receipt, regardless of whether they receive the IP packet or video frame or not. Similar considerations apply to the network 245. In addition, the networks 243 or 245 may work at the level of IP packets or compressed video frames. The illustration 205 also shows additional components or equipment associated with the video program Internet protocol packets source 221, such as dish antenna 209, any other kind of antenna 211 or fiber optic cable connections 213. The video program Internet protocol packets source 221 may source a live television programs or video programs stored in its server including movies and music videos.

Figure 3:
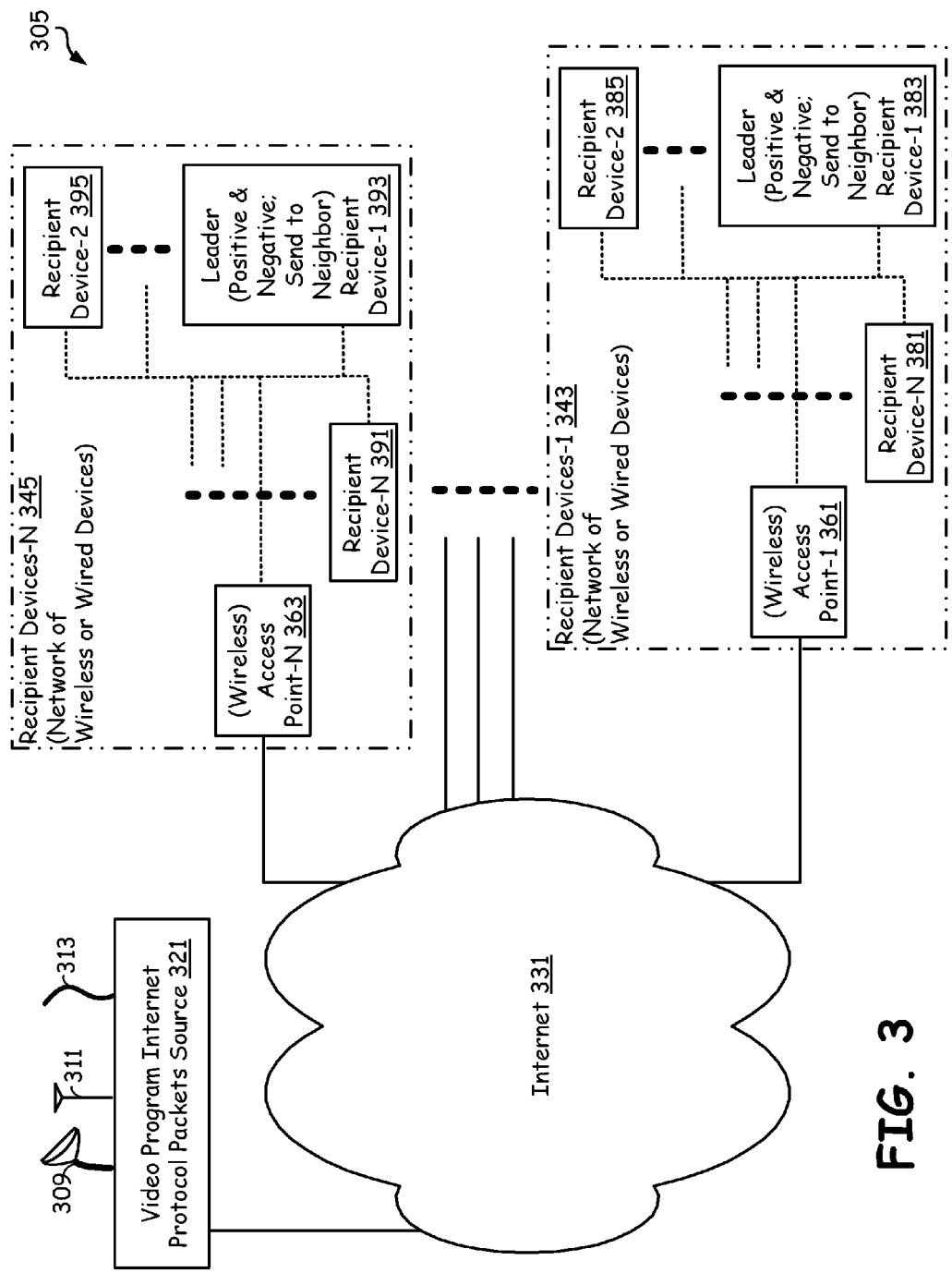
FIG. 3 is a schematic block diagram illustrating a system of wired or wireless electronic networks, each containing an access point that receives video program IP packets from a video program IP packet source via the Internet, and a plurality of communicatively coupled recipient devices, one of which in each network being assigned as a leader for acknowledgment of receipt or negative acknowledgment of non-receipt of IP packets or video frames allowing resending of the IP packets or video frames to the leader and the leader delivering them to the neighboring recipient devices according to one or more embodiments of the present invention.

FIG. 3 is a schematic block diagram illustrating a system 305 of wired or wireless electronic networks, each containing an access point 361 or 363 that receives video program IP packets from a video program IP packet source 321 via the Internet 331, and a plurality of communicatively coupled recipient devices 381, 383, 384 or 391, 393, 395 one of which in each network being assigned as a leader 383 or 393 for acknowledgment of receipt or negative acknowledgment of non-receipt of IP packets or video frames, allowing resending of the IP packets or video frames to the leader 383 or 393 and the leader 383 or 393 delivering them to the neighboring recipient devices (such as 381, 385 or 391, 395) according to one or more embodiments of the present invention.

In this embodiment of the present invention, the leader 383 in the network 343 sends acknowledgment of receipt upon receiving an IP packet or video frame. The rest of the recipient devices such as 381 and 385 may or may not receive the corresponding IP packet or video frame, but do not respond with acknowledgment of receipt. In addition, the leader 383 in the network 343 sends negative acknowledgment of non-receipt upon not receiving an IP packet or video frame. The rest of the recipient devices 381 and 383 again do not respond either by acknowledgment of receipt or negative acknowledgment of non-receipt, regardless of whether they receive the corresponding IP packet or video frame or not.

The access point 361 responds to the negative acknowledgment of non-receipt upon not receiving an IP packet or video frame by the leader 383 by sending the corresponding IP packet or video frame to the leader 383 alone. Unlike the previous two embodiments (of FIGS. 1 and 2), the access point 361 does not multicast send the IP packet or video frame to all of the recipient devices 381, 383 and 385. Then, the leader 383, upon receiving the resent IP packet or video frame, sends them to the neighboring devices such as 381 and 385, regardless of whether they have previously received the corresponding IP packet or video frame. Thus, again, the access point 361 assumes the communication path noise consideration that applies to the leader 383 applies to all of the recipient devices 381 and 385 as well. However, with the embodiment of FIG. 3, the acknowledgement leader serves as a re-transmitter of IP packets/video frames.

Similar considerations apply to the network 345 containing the access point 363 and recipient devices such as 391, 393 and 395 and the leader 393 alone responding by acknowledgment of receipt or negative acknowledgment of non-receipt of IP packets or video frames and then receiving an IP packet or video frame upon negative acknowledgment or non-receipt and sending the corresponding IP packet or video frame to the neighboring recipient devices 391 and 395. Both of the networks 343 and 345 incorporate DRM (Digital Rights Management) overlaying the communication, such that the recipient devices 381, 383, 385 or 391, 393, 395 do not allow users to violate rights of the owners of the video content. The illustration 305 also shows additional components or equipment associated with the video program Internet protocol packets source 321, such as dish antenna 309, any other kind of antenna 311 or fiber optic cable connections 313 that assist in receiving television and video programs from elsewhere around the world.

Figure 4:
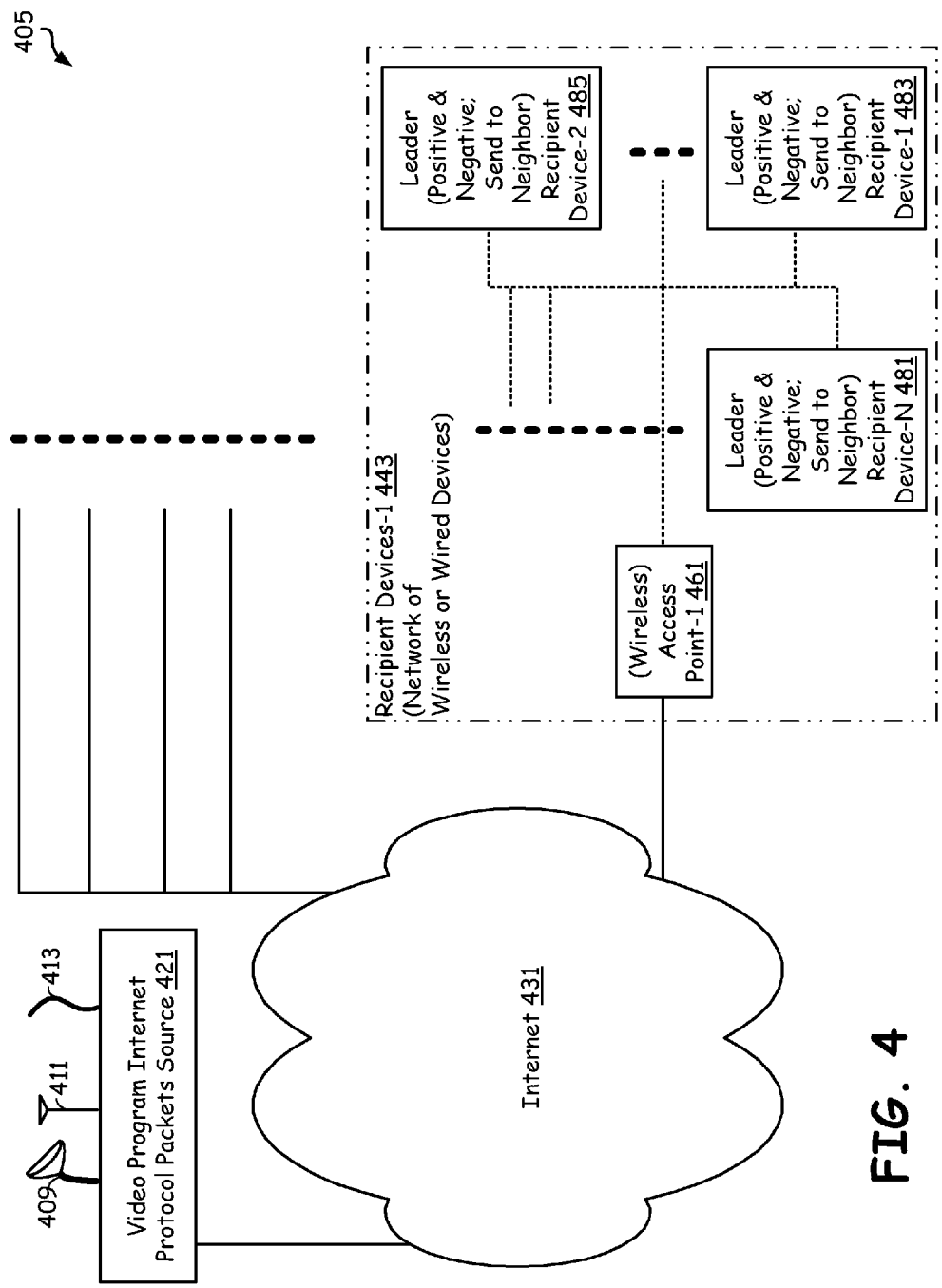
FIG. 4 is a schematic block diagram illustrating a system of wired or wireless electronic networks (only one such network is illustrated here), each containing an access point that receives video program IP packets from a video program IP packet source via the Internet, and a plurality of communicatively coupled recipient devices, all of which are assigned as a leaders for acknowledgment of receipt or negative acknowledgment of non-receipt of IP packets or video frames, allowing resending of the IP packets or video frames to a first recipient device that responds first and the first recipient device delivering them to the neighboring recipient devices according to one or more embodiments of the present invention.

FIG. 4 is a schematic block diagram illustrating a system 405 of wired or wireless electronic networks 443 (only one such network is illustrated here), each containing an access point 461 that receives video program IP packets from a video program IP packet source 421 via the Internet 431, and a plurality of communicatively coupled recipient devices 481, 483 and 485, all of which are assigned as a leaders 481, 483 and 485 for acknowledgment of receipt or negative acknowledgment of non-receipt of IP packets or video frames, allowing resending of the IP packets or video frames to a first recipient device 481, 483 or 485 that responds first and the first recipient device 481, 483 or 485 delivering them to the neighboring recipient devices 481, 483 or 485 according to one or more embodiments of the present invention.

In this embodiment, the wireless access point 461 assigns all of the recipient devices 481, 483 or 485 as leaders 481, 483 or 485 for acknowledgment of receipt or negative acknowledgment of non-receipt of IP packets or video frames. Thus, any of the recipient devices 481, 483, or 485 may respond by either acknowledgment of receipt upon receiving of IP packets or video frames, or negative acknowledgment of non-receipt upon not receiving IP packets or video frames.

For example, when one of the recipient devices (say 483) responds first by acknowledgment of receipt upon receiving an IP packet or video frame, all other recipient devices (481 and 485 in this case) do not respond either by acknowledgment of receipt or negative acknowledgment of non-receipt, regardless of whether they receive the corresponding IP packet or video frame or not. In addition, if any of the recipient devices (say 481) responds first by negative acknowledgment of non-receipt upon not receiving an IP packet or video frame, all other recipient devices (483 and 485 in this case) do not respond either by acknowledgment of receipt or negative acknowledgment of non-receipt, regardless of whether they receive the corresponding IP packet or video frame or not. Then, the access point 461 responds by resending the corresponding IP packet or video frame to the recipient device 481 which sent negative acknowledgment of non-receipt. The recipient device 481 upon receiving the IP packet or video frame, sends them to the neighboring recipient devices (483 and 485 in this case), regardless of whether they received the corresponding IP packet or video frame or not.

The network 443 incorporates DRM (Digital Rights Management) overlaying the communication, such that the recipient devices 481, 483 and 485 do not allow users to violate rights of the owners of the video content. The illustration 405 also shows additional components or equipment associated with the video program Internet protocol packets source 421, such as dish antenna 409, any other kind of antenna 411 or fiber optic cable connections 413 that assist in receiving television and video programs from elsewhere around the world.

Figure 5:
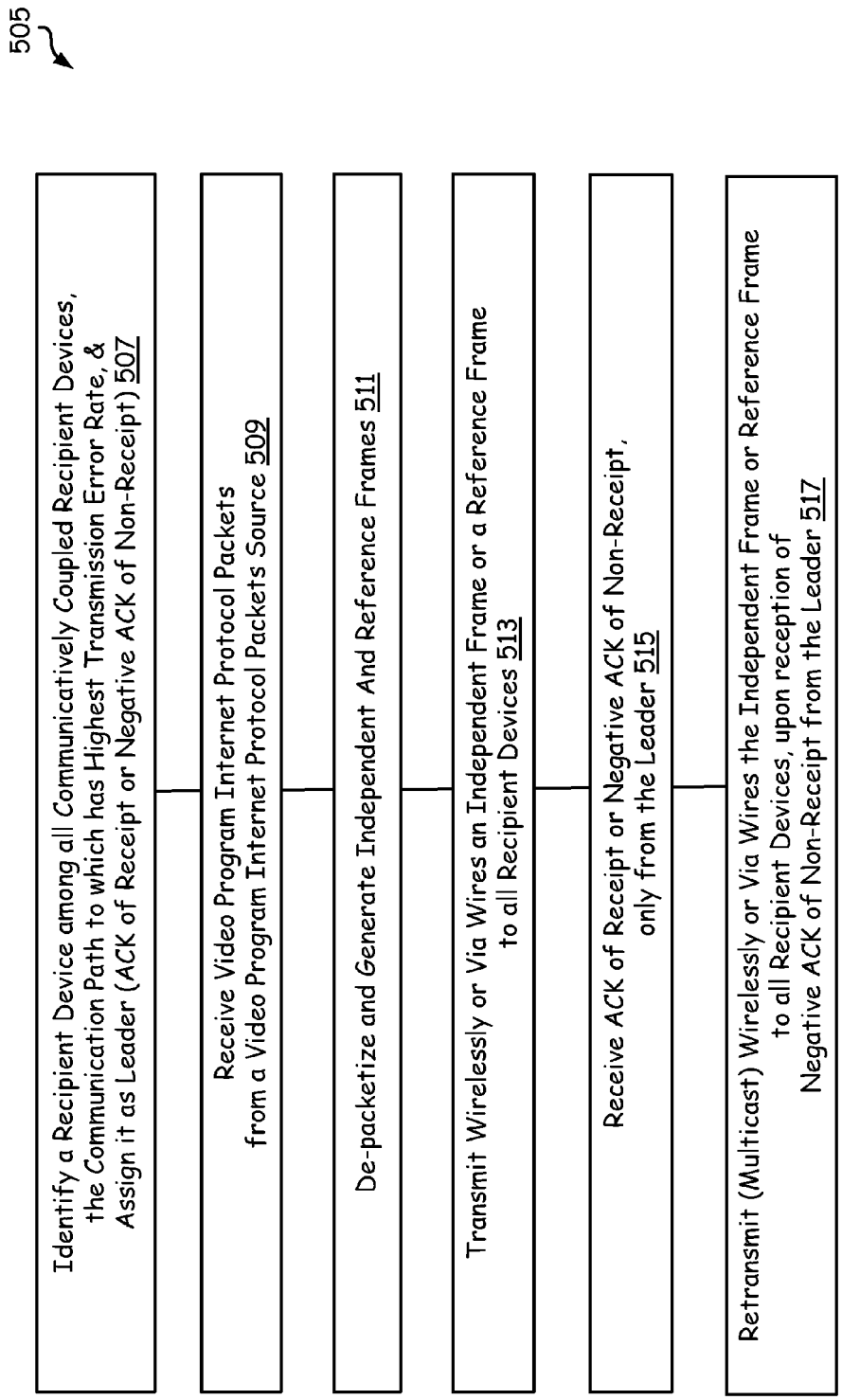
FIG. 5 is a flow diagram illustrating functionality of the access point of FIG. 1, considering delivery of video frames according to one or more embodiments of the present invention.

FIG. 5 is a flow diagram illustrating functionality 505 of the access point of FIG. 1, considering delivery of video frames according to one or more embodiments of the present invention. The functionality begins at a block 507, when the access point identifies one of the pluralities of communicatively coupled recipient devices as a leader to send back acknowledgment of receipt or negative acknowledgment of non-receipt of each of the video frames delivered. The access point selects the recipient device as leader based upon having highest communication path transmission error rate, so that when the leader (recipient device) does not get a video frame, it is likely that most of other recipient devices have not received the video frame either.

At a next block 509, the access point receives video program Internet Protocol (IP) packets from a video program Internet protocol packets source. Then, at a next block 511, the access point de-packetizes the video program Internet Protocol (IP) packets and generates independent and reference video frames. At a next block 513, the access point transmits wirelessly or via wires, an independent or a reference frame to all of the recipient devices.

At a next block 515, the access point receives acknowledgment of receipt from the leader upon receiving the independent or reference video frame, rest of the recipient devices do not send back acknowledgment of receipt or negative acknowledgment of non-receipt, upon receiving or not receiving the independent or reference video frame. On the contrary, if the leader does not receive the independent or reference video frame, the access point receives negative acknowledgment of non-receipt, and again, rest of the recipient devices do not send back acknowledgment of receipt or negative acknowledgment of non-receipt, upon receiving or not receiving the independent or reference video frame. Thus, only leader participates in sending acknowledgment of receipt or negative acknowledgment of non-receipt of the independent or reference video frame, regardless of whether the rest of the recipient devices received it or not.

At a final block 517, the access point responds to the negative acknowledgement of non-receipt of the independent or reference video frame by the leader by multicast resending the independent or reference video frame.

Figure 6:
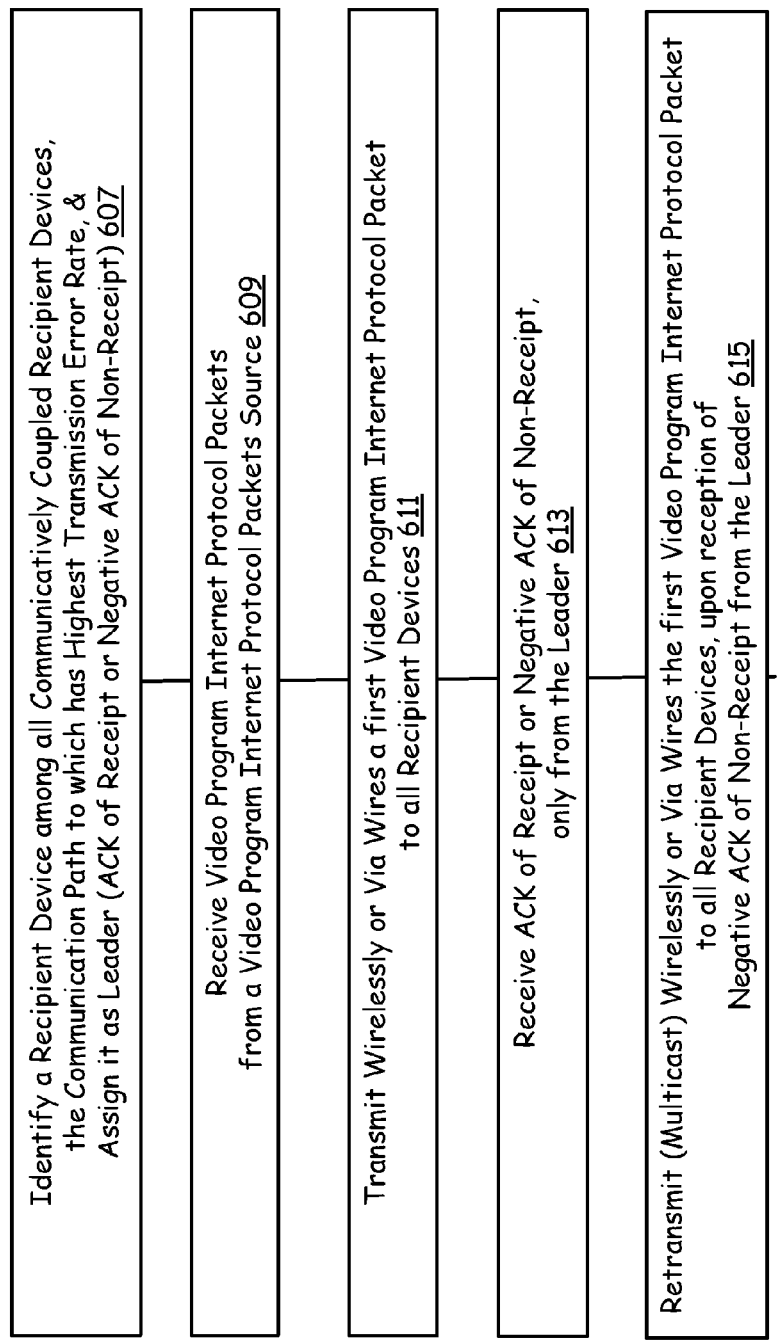
FIG. 6 is a flow diagram illustrating functionality of the access point of FIG. 1, considering delivery of video program IP packets according to one or more embodiments of the present invention.

FIG. 6 is a flow diagram illustrating functionality 605 of the access point of FIG. 1, considering delivery of video program IP packets according to one or more embodiments of the present invention. The functionality begins at a block 607, when the access point identifies one of the pluralities of communicatively coupled recipient devices as a leader, to send back acknowledgment of receipt or negative acknowledgment of non-receipt of video program Internet protocol packets, based upon highest communication path transmission error rate.

At a next block 609, the access point receives video program Internet protocol packets from a video program Internet protocol packets source. Then, the access point, at a next block 611, transmits wirelessly or via wires, a video program Internet protocol packet to all of the recipient devices. At a next block 613, the access point receives acknowledgment of receipt or negative acknowledgment of non-receipt from the leader alone upon receiving the video program Internet protocol packet, but not from rest of the recipient devices. The rest of the recipient devices do not send acknowledgment of receipt or negative acknowledgment of non-receipt regardless of whether they receive the video program Internet protocol packet or not.

At a final block 615, the access point multicast transmits the video program Internet protocol packet in response to receiving the negative acknowledgement of non-receipt from the leader by multicast resending the video program Internet protocol packet to all of the recipient devices.

Figure 7:
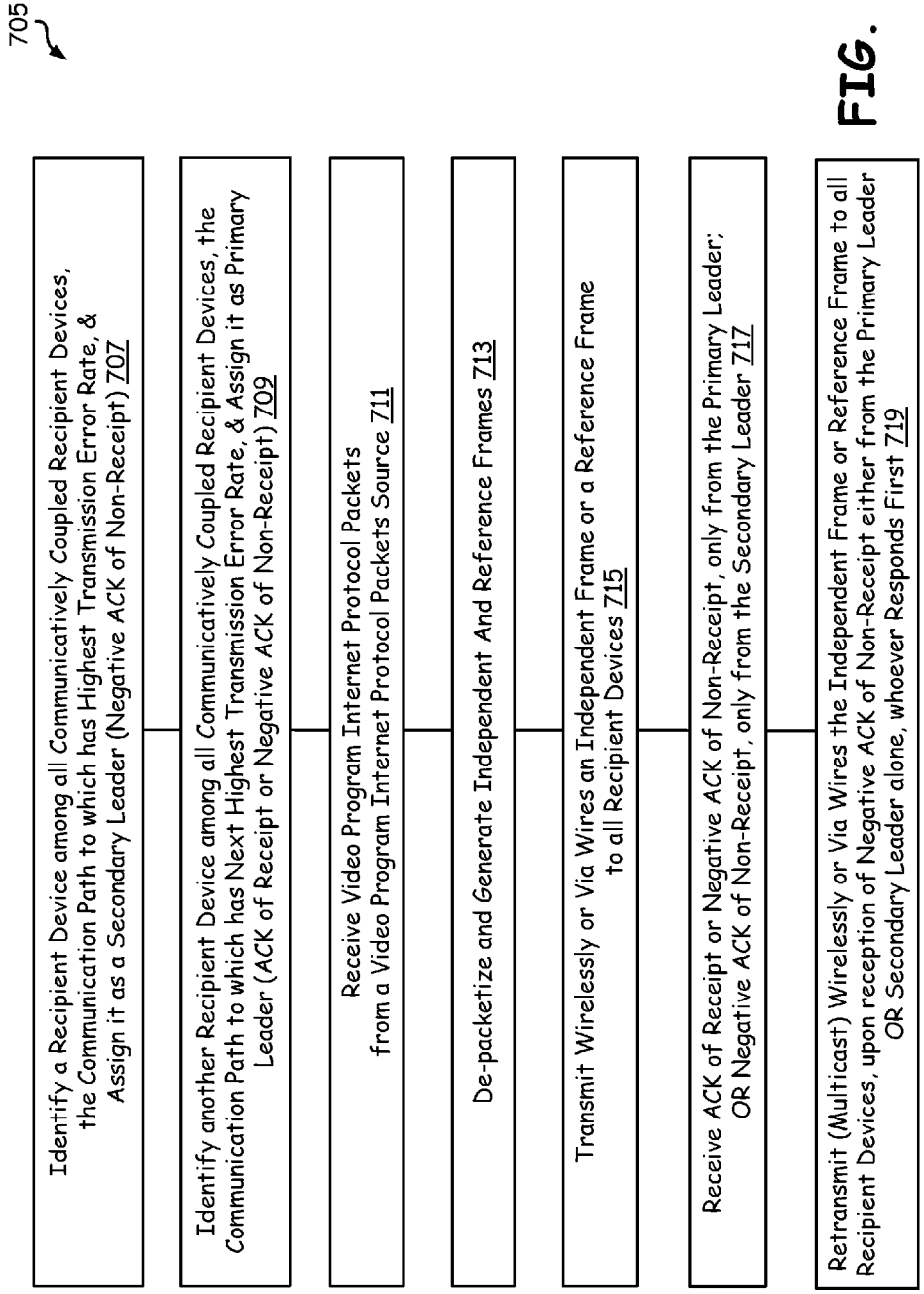
FIG. 7 is a flow diagram illustrating functionality of the access point of FIG. 2, considering delivery of video frames according to one or more embodiments of the present invention.

FIG. 7 is a flow diagram illustrating functionality 705 of the access point of FIG. 2, considering delivery of video frames according to one or more embodiments of the present invention. The functionality begins at a block 707, when the access point assigns a secondary leader, among pluralities of communicatively coupled recipient devices, of negative acknowledgment of non-receipt upon not receiving a video frame. The communication path transmission error rate is one of the highest among secondary leader recipient device communication path. Then, at a block 709, the access point assigns another recipient device among pluralities of communicatively coupled recipient devices as a primary leader of acknowledgment of receipt or negative acknowledgment of non-receipt upon receiving or not receiving video frames, respectively. The access point selects the primary leader based upon having highest communication path transmission error rate.

At a next block 711, the access point receives video program Internet protocol packets from a video program Internet protocol packet source. At a next block 713, the access point de-packetizes the video program Internet protocol packets and generates independent and reference video frames. Then, at a next block 715, the access point transmits, wirelessly or via wires, an independent and reference video frame to all of the communicatively coupled recipient devices.

At a next block 717, the access point receives acknowledgment of receipt or negative acknowledgment of non-receipt upon receiving or not receiving the independent or reference video frame, from the primary leader. The rest of the recipient devices do not send back acknowledgment of receipt or negative acknowledgment of non-receipt regardless of whether they receive the independent or reference video frame or not. The secondary leader may send back negative acknowledgment of non-receipt upon not receiving the independent or reference video frame, but not acknowledgment of receipt upon receiving the independent or reference video frame.

At a final block 719, the access point responds to the negative acknowledgment of non-receipt of the independent or reference video frame, either by the primary leader or secondary leader, by multicast resending the independent or reference video frame to all of the recipient devices.

Figure 8:
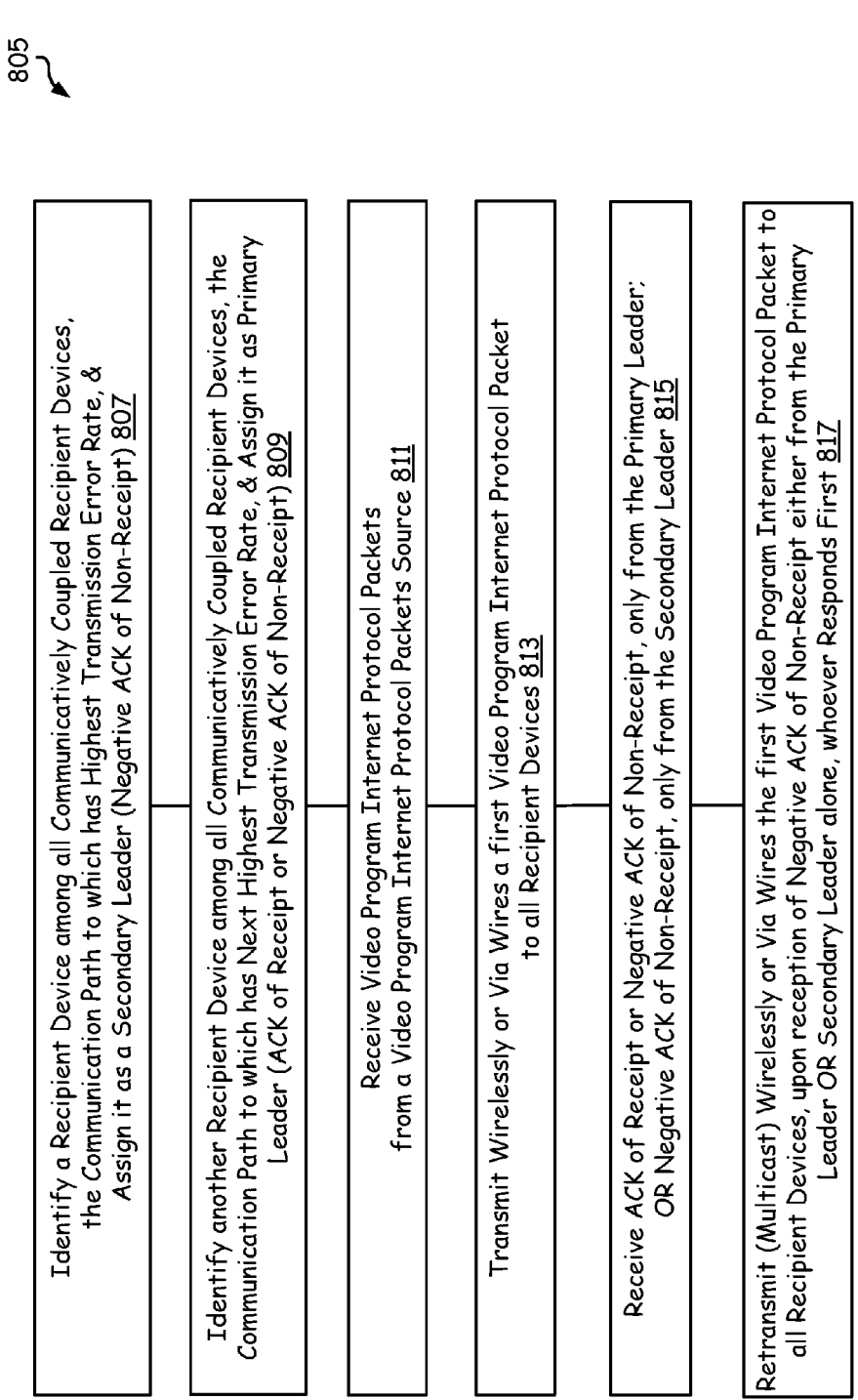
FIG. 8 is a flow diagram illustrating functionality of the access point of FIG. 2, considering delivery of video program IP packets according to one or more embodiments of the present invention.

FIG. 8 is a flow diagram illustrating functionality 805 of the access point of FIG. 2, considering delivery of video program IP packets according to one or more embodiments of the present invention. The functionality begins at a block 807, when the access point assigns a secondary leader, of negative acknowledgment of non-receipt upon not receiving video program Internet protocol packets, among the pluralities of communicatively coupled recipient devices based upon communication path transmission error rate. The secondary leader does not send any acknowledgment of receipt upon receiving video program Internet protocol packets. At a next block 809, the access point assigns another of plurality of communicatively coupled recipient devices as a primary leader, of acknowledgment of receipt or negative acknowledgment of non-receipt upon receiving or not receiving video program Internet protocol packets respectively, based upon communication path transmission error rate.

Then, at a next block 811, the access point receives video program Internet protocol packets from a video program Internet protocol packets source. At a next block 813, the access point transmits, wirelessly or via wires, a first video program Internet protocol packet to all of the recipient devices. At a next block 815, the access point receives negative acknowledgment of non-receipt upon not receiving the video program Internet protocol packet from the secondary leader. In addition, the access point may receive acknowledgment of receipt or negative acknowledgment of non-receipt upon receiving or not receiving the video program Internet protocol packet respectively, from the primary leader.

At a final block 817, the access point multicast retransmits the video program Internet protocol packet if it receives any negative acknowledgment of non-receipt of the video program Internet protocol packet, either by the primary leader or secondary leader, to all of the recipient devices.

Figure 9:
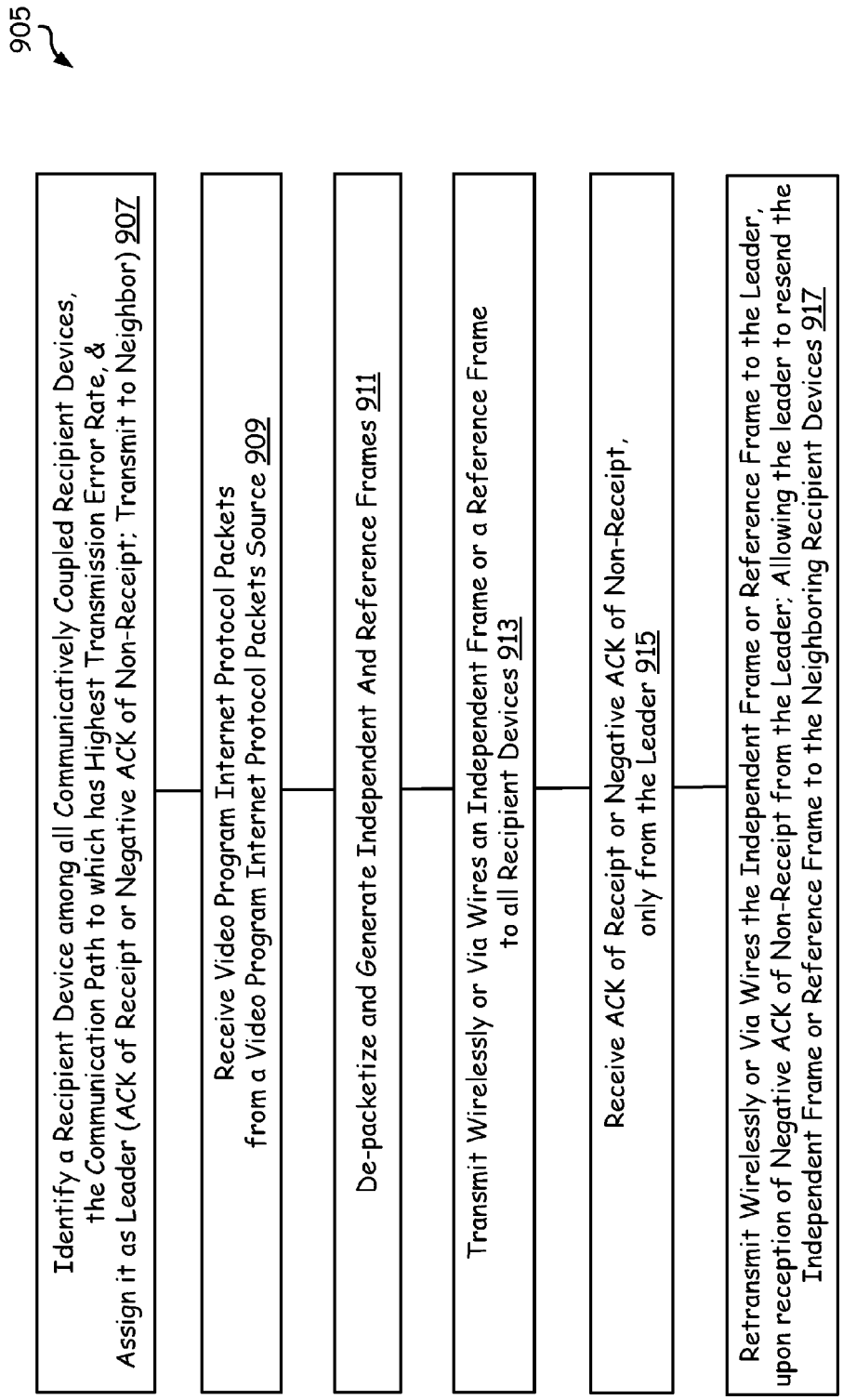
FIG. 9 is a flow diagram illustrating functionality of the access point of FIG. 3, considering delivery of video frames according to one or more embodiments of the present invention.

FIG. 9 is a flow diagram illustrating functionality 905 of the access point of FIG. 3, considering delivery of video frames according to one or more embodiments of the present invention. The functionality begins at a block 907, when the access point assigns one of the pluralities of communicatively coupled recipient devices having highest communication path transmission error rate as a leader for sending acknowledgment of receipt or negative acknowledgement of non-receipt.

At a next block 909, the access point receives video program Internet protocol packets from a video program Internet protocol packet source. Then, the access point, at a next block 911, de-packetizes and generates independent and reference video frames. At a next block 913, the access point transmits wirelessly or via wires an independent or a reference video frame to all of the communicatively coupled recipient devices.

At a next block 915, the access point receives acknowledgment of receipt or negative acknowledgment of non-receipt, upon receiving or not receiving the independent or reference video frame respectively, from the leader alone. The rest of the devices do not respond either by acknowledgment of receipt or negative acknowledgment of non-receipt, regardless of whether they receive the independent or reference video frame. At a final block 917, the access point responds to the negative acknowledgment of non-receipt from the leader by resending the independent or reference video frame to the leader alone. The leader then sends the resent independent or reference video frames to communicatively coupled neighboring recipient devices.

Figure 10:
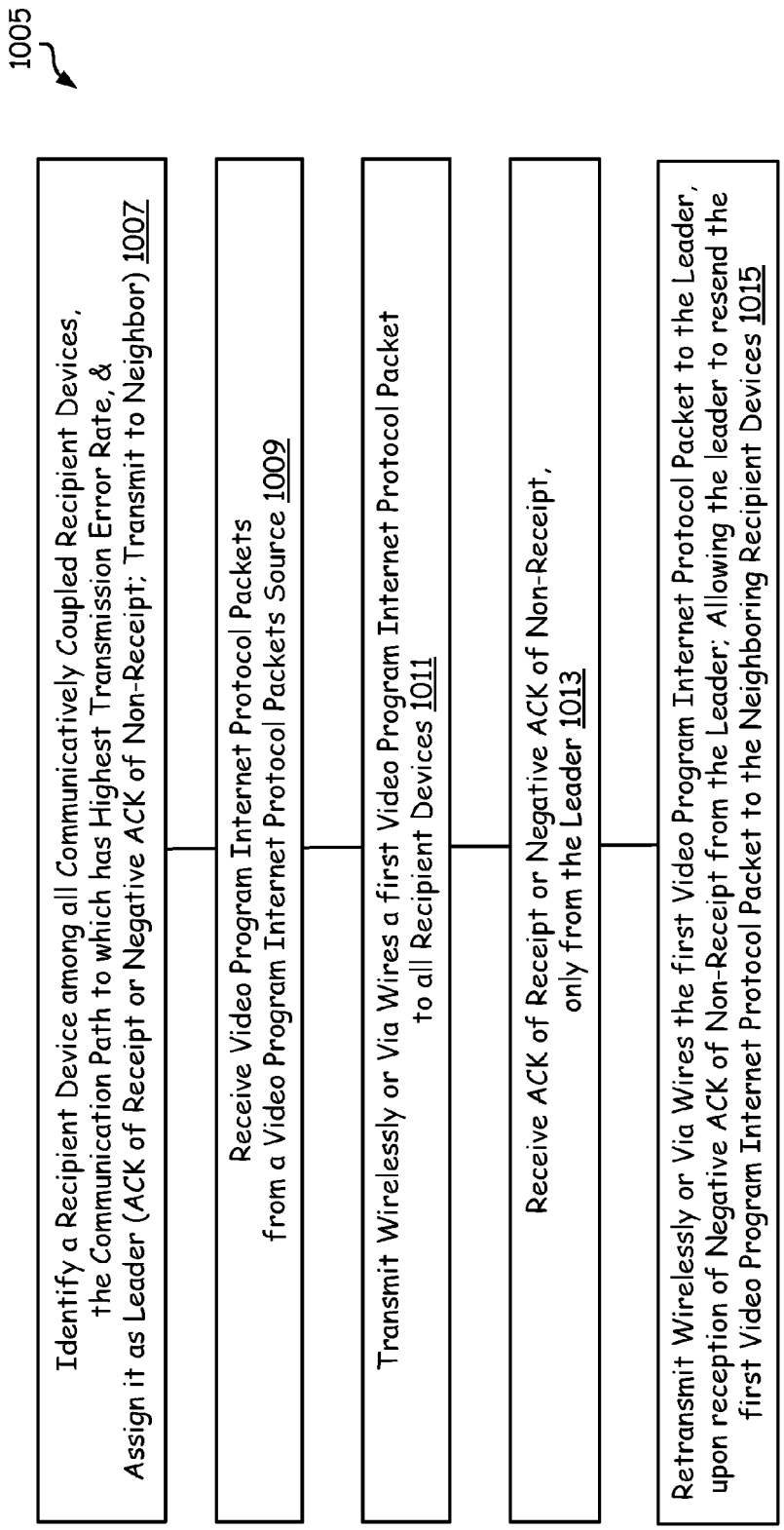
FIG. 10 is a flow diagram illustrating functionality of the access point of FIG. 3, considering delivery of video program IP packets according to one or more embodiments of the present invention.

FIG. 10 is a flow diagram illustrating functionality 1005 of the access point of FIG. 3, considering delivery of video program IP packets according to one or more embodiments of the present invention. The functionality begins at a block 1007, when the access point assigns one of the pluralities of communicatively coupled recipient devices, having highest communication path transmission error rate, as a leader for sending back acknowledgment of receipt or negative acknowledgment of non-receipt, upon receiving or not receiving a video program Internet protocol packet, respectively.

Then, at a next block 1009, the access point receives video program Internet protocol packets from a video program Internet protocol packets source. Then, at a next block 1011, the access point transmits wirelessly or via wires a video program Internet protocol packet to all of the communicatively coupled recipient devices.

At a next block 1013, the access point receives acknowledgment of receipt upon receiving the video program Internet protocol packet or negative acknowledgment of non-receipt upon not receiving the video program Internet protocol packet respectively, from the leader. The rest of the communicatively coupled recipient devices does not respond either by acknowledgment of receipt or negative acknowledgment of non-receipt, regardless of whether they receive the video program Internet protocol packet or not.

The access point, at a final block 1015, responds to the negative acknowledgment of non-receipt (of not receiving the video program Internet protocol packet) from the leader by resending the video program Internet protocol packet to the leader. Then, the leader sends the resent video program Internet protocol packet to all of the neighboring recipient devices, regardless of whether they received the video program Internet protocol packet or not.

Figure 11:
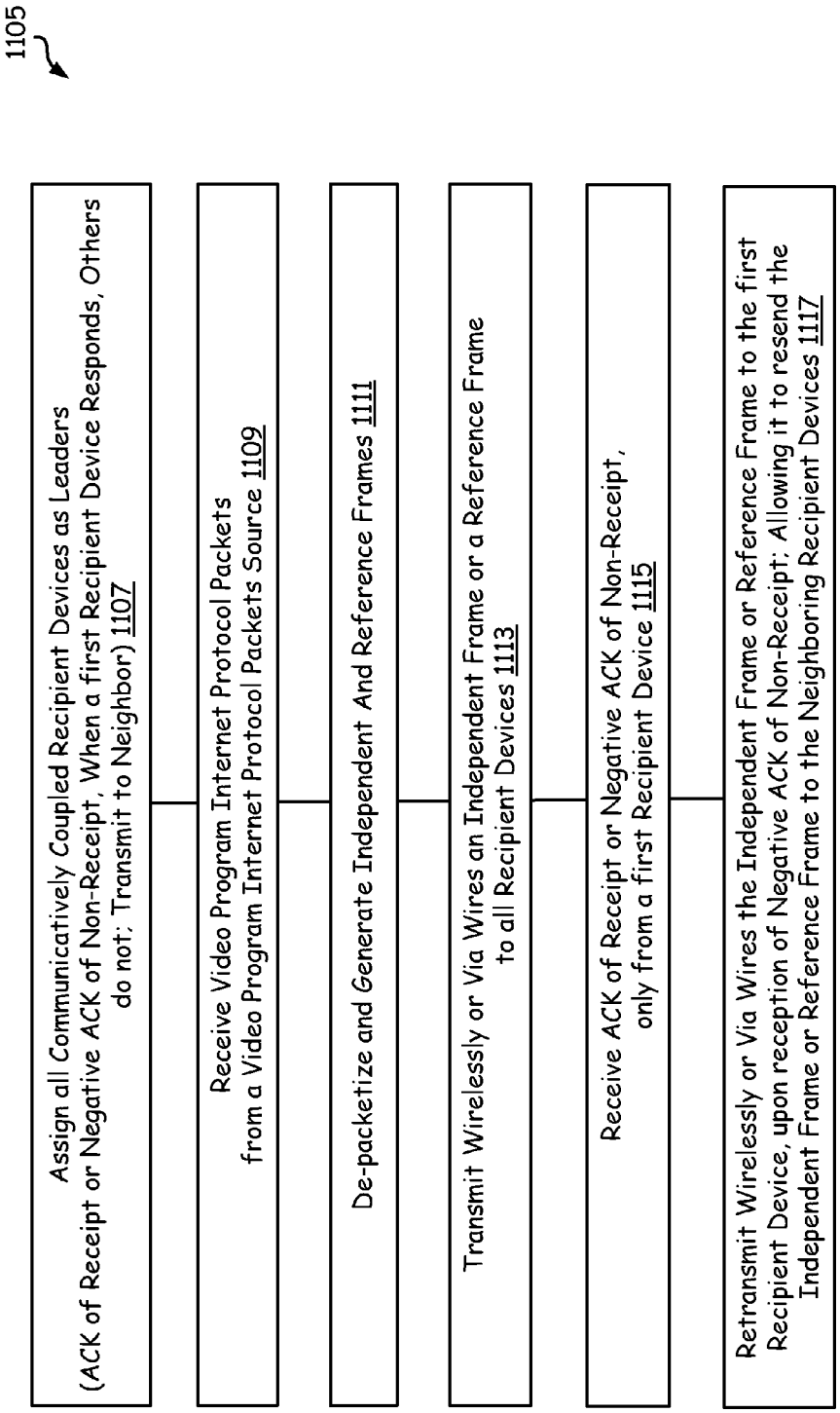
FIG. 11 is a flow diagram illustrating functionality of the access point of FIG. 4, considering delivery of video frames according to one or more embodiments of the present invention.

FIG. 11 is a flow diagram illustrating functionality 1105 of the access point of FIG. 4, considering delivery of video frames according to one or more embodiments of the present invention. The functionality begins at a block 1107, when the access point assigns (or assumes) each of the pluralities of communicatively coupled recipient devices as a leader for sending back acknowledgment of receipt upon receiving a video frame or negative acknowledgment of non-receipt upon not receiving the video frame. When one of the recipient devices responds first by an acknowledgment of receipt upon receiving a video frame or negative acknowledgment of non-receipt upon not receiving the video frame, rest of the recipient devices do not respond.

At a next block 1109, the access point receives video program Internet protocol packets from a video program Internet protocol packets source. At a next block 1111, the access point de-packetizes and generates independent or reference video frames. At a next block 1113, the access point transmits, wirelessly or via wires, an independent or a reference video frame to all of the recipient devices.

At a next block 1115, the access point receives an acknowledgment of receipt upon receiving the independent or reference video frame or negative acknowledgment of non-receipt upon not receiving the independent or reference video frame from a first recipient device, rest of the recipient devices do not respond. At a final block 1117, the access point responds to receiving negative acknowledgment of non-receipt upon not receiving the independent or reference video frame from the first recipient device by resending the independent or reference video frame to the first recipient device alone. Then, the first recipient device sends the resent independent or reference video frame to all of the neighboring recipient devices.

Figure 12:
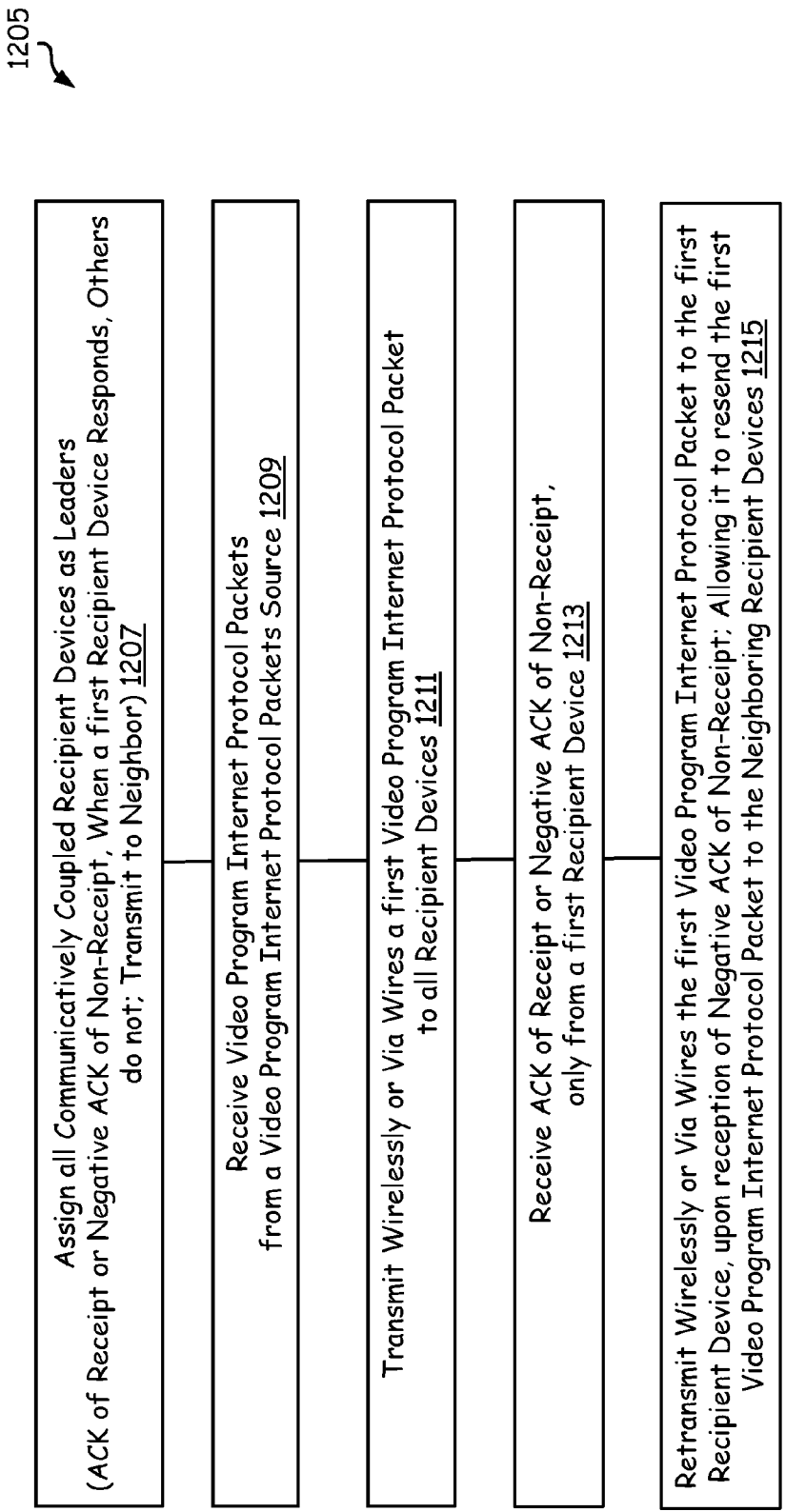
FIG. 12 is a flow diagram illustrating functionality of the access point of FIG. 4, considering delivery of video program IP packets according to one or more embodiments of the present invention.

FIG. 12 is a flow diagram illustrating functionality 1205 of the access point of FIG. 4, considering delivery of video program IP packets. The functionality begins at a block 1207, when the access point assigns (or assumes) all of the communicatively coupled recipient devices as leaders for sending back acknowledgment of receipt upon receiving a video program Internet protocol packet or negative acknowledgment of non-receipt upon not receiving the video program Internet protocol packet. Once a first recipient device responds either by acknowledgment or negative acknowledgment, the rest of the recipient devices do not send back any acknowledgment or negative acknowledgment.

At a next block 1209, the access point receives video program Internet protocol packets from a video program Internet protocol packets source. Then, the access point, at a next block 1211, transmits, wirelessly or via wires, a video program Internet protocol packet to all of the communicatively coupled recipient devices.

At a next block 1213, the access point receives acknowledgment of receipt or negative acknowledgment of non-receipt upon receiving or not receiving the video program Internet protocol packet, respectively, from a first recipient device. The rest of the recipient devices do not respond once the first recipient device sends back acknowledgment of receipt or negative acknowledgment of non-receipt upon receiving or not receiving the video program Internet protocol packet, respectively. At a final block 1215, the access point responds to the negative acknowledgment of non-receipt upon not receiving the video program Internet protocol packet from the first recipient device by resending the video program Internet protocol packet to the first recipient device alone. Then, the first recipient device sends the resent video program Internet protocol packet to all of the neighboring recipient devices.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks/modules illustrating the performance of certain significant functions. The boundaries of these functional building blocks/modules have been arbitrarily defined for convenience of description. Alternate boundaries could be defined as long as the certain significant functions are appropriately performed. For example, functional modules illustrated may be software and/or hardware modules that perform the indicated functionality but are not limited to hardware only or software only. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

I claim:

1. A method comprising:

transmitting packets from a packet source to a plurality of wireless devices;

selecting a first wireless device from the plurality of wireless devices as a primary leader, the primary leader having a highest transmission error rate of receipt of the packets among the plurality of wireless devices, wherein the primary leader to either respond with an acknowledgment of receipt of packets transmitted to the plurality of wireless devices, when the primary leader receives the transmitted packets, or to respond with a negative acknowledgment of non-receipt of the packets, when the primary leader does not receive the transmitted packets;

selecting a second wireless device from the plurality of wireless devices as a secondary leader, the secondary leader having a second highest transmission error rate of receipt of the packets among the plurality of wireless devices, wherein the secondary leader to respond with a negative acknowledgment of non-receipt of the packets transmitted to the plurality of wireless devices, when the secondary leader does not receive the transmitted packets, but not respond with an acknowledgment of receipt of the packets, when the secondary leader receives the transmitted packets; and retransmitting packets from the packet source to the plurality of wireless devices, when either of the primary leader or the secondary leader responds with a negative acknowledgment of non-receipt of the packets.

2. The method of claim 1, wherein the plurality of wireless devices comprises at least three wireless devices.

3. The method of claim 1, wherein the selecting of the primary leader and the secondary leader is performed by an access point.

4. The method of claim 1, wherein transmitting the packets includes transmitting Internet Protocol (IP) packets.

5. The method of claim 1, wherein transmitting the packets includes transmitting video packets.

6. The method of claim 1, wherein the packets are transmitted using Digital Rights Management protection to protect content in the packets.

7. The method of claim 1, wherein:
the packets carry independent video frames and dependent video frames; and
retransmitting includes only independent video frames.

8. A method comprising:
transmitting video frames from a video source to a plurality of wireless devices;
selecting a first wireless device from the plurality of wireless devices as a primary leader, the primary leader having a highest transmission error rate of receipt of the video frames among the plurality of wireless devices, wherein the primary leader to either respond with an acknowledgment of receipt of video frames transmitted to the plurality of wireless devices, when the primary leader receives the transmitted video frames, or to respond with a negative acknowledgment of non-receipt of the video frames, when the primary leader does not receive the transmitted video frames;
selecting a second wireless device from the plurality of wireless devices as a secondary leader, the secondary leader having a second highest transmission error rate of receipt of the video frames among the plurality of wireless devices, wherein the secondary leader to respond with a negative acknowledgment of non-receipt of the video frames transmitted to the plurality of wireless devices, when the secondary leader does not receive the transmitted video frames, but not respond with an acknowledgment of receipt of the video frames, when the secondary leader receives the transmitted video frames; and
retransmitting video frames to the plurality of wireless devices, when either of the primary leader or the secondary leader responds with a negative acknowledgment of non-receipt of the video frames.

9. The method of claim 8, wherein the plurality of wireless devices comprises at least three wireless devices.

10. The method of claim 8, wherein the selecting of the primary leader and the secondary leader is performed by an access point.

11. The method of claim 8, wherein transmitting the video frames includes transmitting independent frames and reference frames.

12. The method of claim 8, further comprising de-packetizing to generate independent frames and reference frames, wherein transmitting the video frames includes transmitting the independent frames and reference frames.

13. The method of claim 8, wherein the video frames are transmitted using Digital Rights Management protection to protect content in the video frames.

14. The method of claim 8, wherein:
the video frames include independent video frames and dependent video frames; and
retransmitting includes only independent video frames.

15. An apparatus comprising a source device in a network of a plurality of wireless devices, in which the source device is configured to:
transmit a video stream to a plurality of wireless devices;
select a first wireless device from the plurality of wireless devices in the network as a primary leader, the primary leader having a highest transmission error rate of receipt of the video stream among the plurality of wireless devices; and
select a second wireless device from the plurality of wireless devices in the network as a secondary leader, the secondary leader having a second highest transmission error rate of receipt of the video stream among the plurality of wireless devices,
wherein the primary leader is to either respond with an acknowledgment of receipt of the video stream transmitted to the plurality of wireless devices, when the primary leader receives the transmitted video stream, or to respond with a negative acknowledgment of non-receipt of the video stream, when the primary leader does not receive the transmitted video stream, and
wherein the secondary leader is to respond with a negative acknowledgment of non-receipt of the video stream transmitted to the plurality of wireless devices, when the secondary leader does not receive the transmitted video stream, but the secondary leader does not respond with an acknowledgment of receipt of the video stream, when the secondary leader receives the transmitted video stream, and in which the source device to retransmit the video stream to the plurality of wireless devices, when either of the primary leader or the secondary leader responds with a negative acknowledgment of non-receipt of the video stream.

16. The apparatus of claim 15, wherein the source device is an access point.

17. The apparatus of claim 16, wherein the plurality of wireless devices comprises at least three wireless devices.

18. The apparatus of claim 16, wherein the video stream includes Internet Protocol (IP) packets.

19. The apparatus of claim 16, wherein the video stream includes video frames.

20. The apparatus of claim 15, wherein:
the video stream includes independent video frames and dependent video frames; and
retransmitting includes only retransmitting independent video frames.

* * * * *